Patented Mar. 29, 1927.

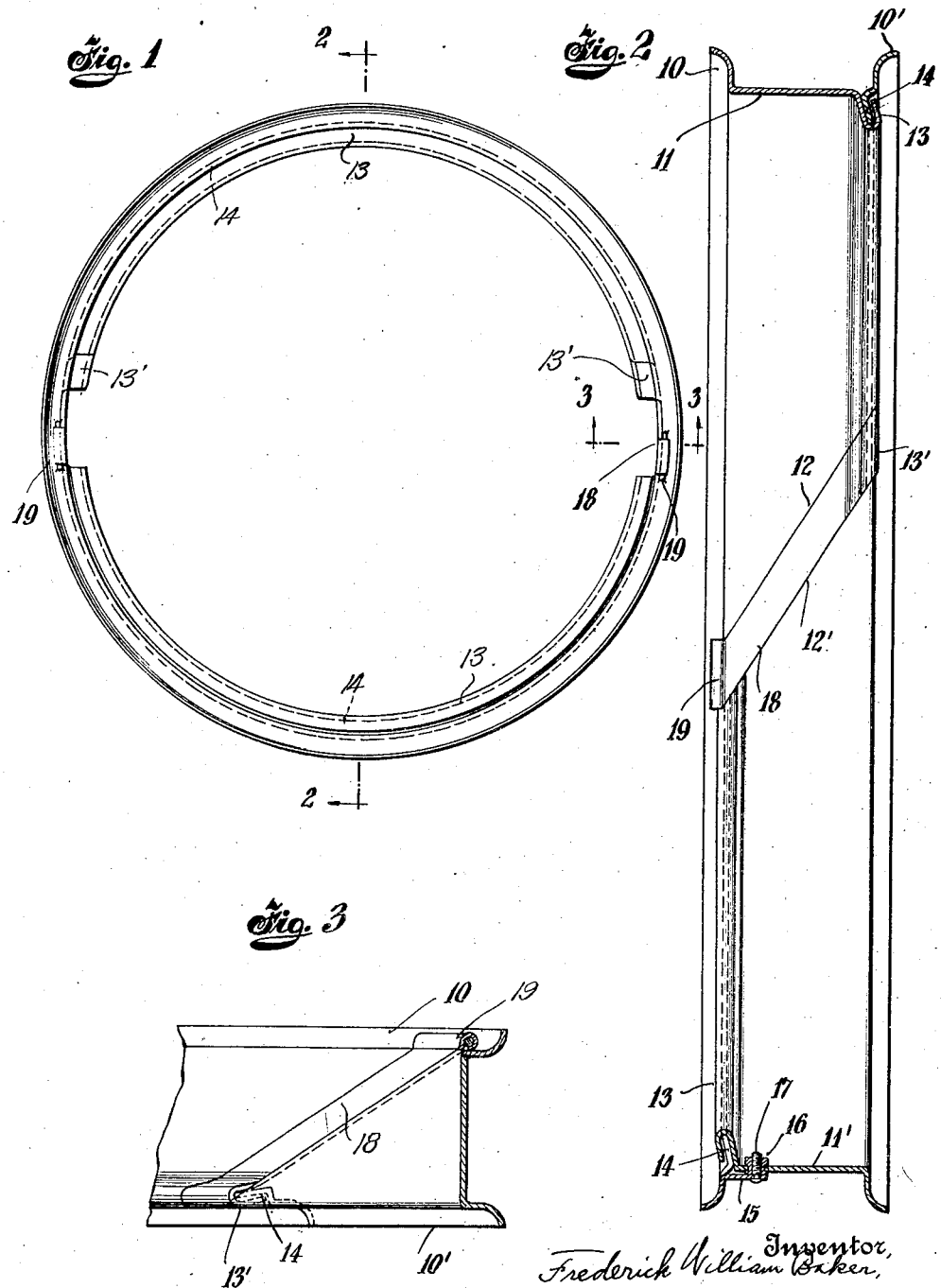

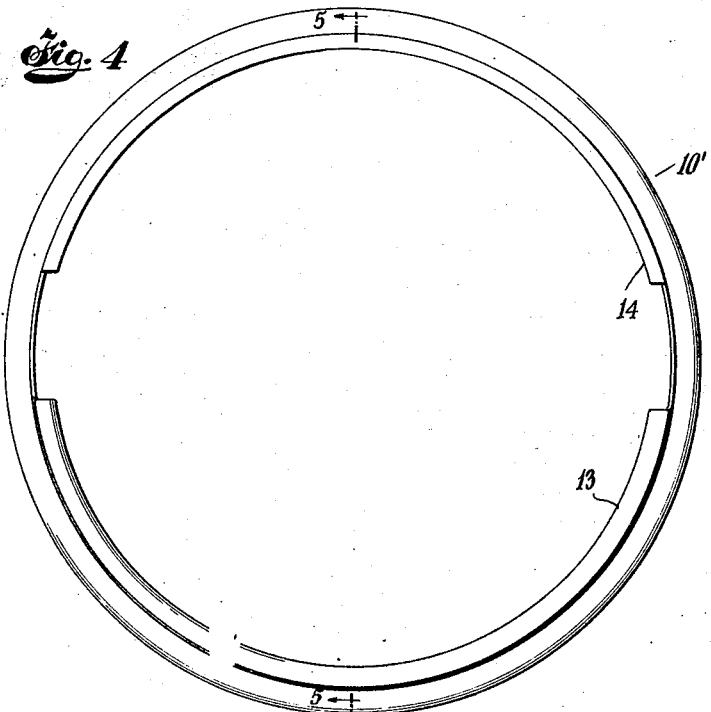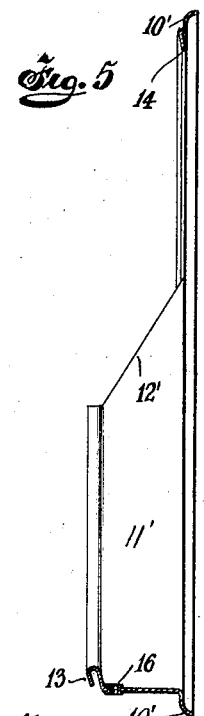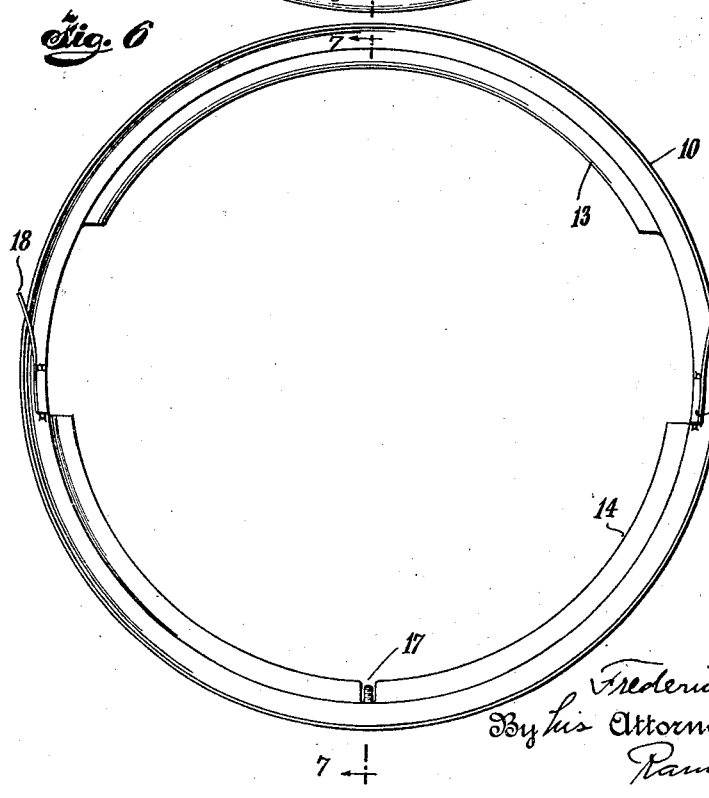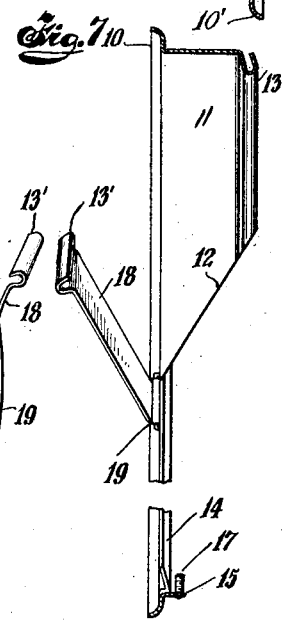

1,622,270

UNITED STATES PATENT OFFICE.

FREDERICK WILLIAM BAKER, OF STOURBRIDGE, ENGLAND, ASSIGNOR TO TRINITY WHEEL CORPORATION, A CORPORATION OF NEW YORK.

DEMOUNTABLE WHEEL RIM.

Application filed February 1, 1926. Serial No. 85,261.

My invention relates to improvements in demountable wheel rims such as are adapted to carry a tire, and such as are generally used on motor cars and the like. The object of my invention is to produce a strong, simple, economical rim which can be easily applied to a wheel and readily adapted to any kind of tire, which can be conveniently disassembled so as to permit the easy removal of the tire, and which can as easily be arranged so that one section of the rim or both sections thereof can be displaced if desired. In carrying out my invention I preferably provide a rim formed of two sections each having a continuous flange. Each of the flanges carries a large segment of the tire bed, and the sections of the rim are complementary so that when placed in proper spaced relation the bed segments will combine to produce a complete bed. I also preferably arrange a removable segment which in the embodiment illustrated is a hinged segment forming a part of the tire bed, but easily removable to permit the partial collapse of the rim and the removal of either or both parts thereof.

A further object of the invention is to construct the complementary parts of the rim so that an extension of one flange will readily enter into locking engagement with a hollow rib or socket member of the opposed part in a way to securely lock the two parts of the rim together without extraneous fastenings, and in a manner to permit their easy separation. Another object of the invention is to construct the rim in such a way that the parts can if desired be easily and cheaply rolled or stamped from sheet metal, and further to make them adaptable to any preferred form of tire.

Reference is to be had to the accompanying drawings forming a part of this specification, in which similar reference characters indicate corresponding parts in all the views.

Figure 1 is a side elevation of the rim embodying my invention.

Figure 2 is a cross section on the line 2—2 of Figure 1.

Figure 3 is a cross section on the line 3—3 of Figure 1.

Figure 4 is a side elevation of one member of the rim.

Figure 5 is a cross section on the line 5—5 of Figure 4.

Figure 6 is an elevation of the second rim member, and

Figure 7 is a cross section on the line 7—7 of Figure 6.

The complete rim has two continuous flange members 10—10' which in their general contour are shown conventional, but can be made to conform to any preferred style of tire. Each flange member has integral therewith a large segment 11 or 11' of the tire bed, and the bed part 11 of one flange corresponds to the bed part 11' of the second flange, these portions 11—11' together forming the greater part of the rim bed, but they are separated at their adjacent ends preferably along oblique lines 12—12' to provide for partial collapse and adjustment or removal, as will appear. Each flange member has for a part of its inner circumference a segmental lip or extension 14, and on the opposite edge of its web or bed portion 11 or 11' it has an inwardly extending hollow rib 13 forming a socket so that the flange extension 14 of one member 10 or 10' can enter a corresponding rib or socket portion 13 of the opposite member when the parts are in proper relation.

If desired the parts can be locked as illustrated in Figure 2, where the extension 14 is turned in to form a lug 15 through which extends a screw 17 engaging a nut 16 in the adjacent part 11'.

The principal means of locking the complementary parts of the rim together comprises the hinge members 18 which act as keys, and which fit between the adjacent end portions 12 and 12' of the members 11 and 11', as shown clearly in Figure 2. Each key 18 is hinged as shown at 19 slightly outside the members 14 or 13 as the case may be and each key 18 has at its free end a section 13' adapted to align with and form a continuation of the hollow rib or socket member 13. Thus when the complementary parts of the rim are adjusted with relation to each other, the members 18 can be turned into position to fill out the bed of the rim, that is to say they will come into the same plane with the parts 11 and 11', making the bed continuous and the rim substantially solid.

It will be observed that the parts 13 and 14 act as substantially radial braces to strengthen the rim, thus making it very strong, and as these engaging parts are disposed half on one side portion of the rim and half on the other, the bracing will be balanced, and the rim as a whole will be light and strong, while its shape is such that it can be readily stamped out if desired.

It will be noticed that by bringing the complementary parts 10 and 10' in proper relation, then lifting one with relation to the other and locking the members 18 in position, the rim is brought to its full size and in position to securely carry its tire, while by releasing the members 18 the bed of the rim is shortened and the tire can be readily removed, and further either flange and its attached bed segment can be removed if desired.

I claim:—

1. A demountable wheel rim comprising opposed side flanges each carrying a segment of the rim bed, and means on each segment for placing the segment carried by one flange in locking engagement with a portion of the opposed flange.

2. A wheel rim comprising opposed side flanges each having a segment of the rim bed integral therewith, and a socket member on the edge of each segment engaging a complementary part of the opposed flange.

3. A wheel rim comprising opposed side flanges each having a segment of a rim bed rigid thereon and each having an inwardly extending socket member at the edge of its bed segment and an inner flange extension for a portion of its circumference, whereby the flange extension of one flange member will engage the socket member of the opposed flange member.

4. A wheel rim comprising side flanges each having a substantially large segment of the rim bed thereon, with means on the edge portion of one segment to engage a flange of the opposed segment, and a removable member connecting the two rim parts and bridging the connection between the adjacent bed segments.

5. A wheel rim comprising opposed complementary parts each having a continuous side flange and a segment of the rim bed, means for engaging the segment of each member to the opposite flange, and a bridging segment hinged to one member of the rim and bridging the space between the two adjacent segments to complete the rim bed.

6. A wheel rim comprising opposed complementary parts each having a continuous side flange and a segment of the rim bed, means for placing the complementary members in locking engagement, and a removable segment connecting the opposed parts of the rim and bridging the space between the two bed segments.

7. A wheel rim comprising opposed complementary parts each having a continuous side flange, a bed segment, and an inwardly extending socket portion at the edge of its segment, and each having an inwardly extending flange to enter into sliding engagement with the said socket.

8. A wheel rim comprising opposed complementary members each having a side flange, a segment of the rim bed and a hollow rib portion at the edge of its segment, and each having a flange extension, whereby the flange extension of one member enters the hollow rib of the opposed member, and a hinged segment on each member bridging the space between the opposed segments, said hinged member having at its free end an extension of the said hollow rib.

9. A wheel rim comprising opposed complementary parts each carrying a segment of the rim bed, means for engaging the opposed parts in locking relation, and a hinged section bridging the space between the opposed bed segments.

In testimony whereof, I have signed my name to this specification this 28th day of January, 1926.

FREDERICK WILLIAM BAKER.